(12) United States Patent
Ferrer (10) Patent No.: US 7,085,655 B2
(45) Date of Patent: Aug. 1, 2006

(54) METHOD AND DEVICE FOR DETECTING DEFECTS OF AT LEAST ONE ROTARY WING AIRCRAFT ROTOR

(75) Inventor: Rogelio Ferrer, Marseilles (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 10/506,691

(22) PCT Filed: May 15, 2002

(86) PCT No.: PCT/FR02/01630

§ 371 (c)(1),
(2), (4) Date: Sep. 3, 2004

(87) PCT Pub. No.: WO03/085366

PCT Pub. Date: Oct. 16, 2003

(65) Prior Publication Data

US 2005/0125103 A1   Jun. 9, 2005

(30) Foreign Application Priority Data

Mar. 18, 2002   (FR) .................................. 02 03312

(51) Int. Cl.
*G06F 19/00*   (2006.01)

(52) U.S. Cl. .............................. 702/35; 702/56; 73/583

(58) Field of Classification Search .................. 702/35, 702/54, 56; 73/570, 583

See application file for complete search history.

(56) References Cited

U.S. PATENT DOCUMENTS 4,937,758 A   6/1990   Hayden et al.

(Continued)

FOREIGN PATENT DOCUMENTS

DE             19808197          9/1999

(Continued)

OTHER PUBLICATIONS

"Learning Representation by Back-Propagation Errors," D. Rumlhart, G. Hinton and R. Williams, *Nature*, 1986, vol. 323, pp. 533-536.

*Primary Examiner*—John Barlow
*Assistant Examiner*—Jonathan Moffat
(74) *Attorney, Agent, or Firm*—Young & Thompson (57) ABSTRACT

A method and apparatus for detecting the defects of at least one rotor of a rotary wing aircraft, in particular a helicopter, in order to adjust the rotor. In the method, in a preliminary step, a reference aircraft is used corresponding to a particular type of aircraft and having a rotor (6, 10) without defect and adjusted so that the level of vibration is at a minimum, a series of measurements are taken on the aircraft (1), and a neural network is deduced therefrom illustrating the relationships between accelerations representative of vibration, and defects, and adjustment parameters. Thereafter, in a later step, for a particular aircraft (1) of the same type, measurements are taken on the particular aircraft (1) and on the basis of said measurements and on the basis of the neural network, the defects, if any, are detected and values for the adjustment parameters are determined that will enable the level of vibration of the aircraft (1) to be minimized, which parameters are applied to the rotor (6, 10).

17 Claims, 2 Drawing Sheets

U.S. PATENT DOCUMENTS

| | | |
|---|---|---|
| 5,544,073 A | 8/1996 | Piety et al. |
| 5,901,272 A | 5/1999 | Schaefer, Jr. et al. |
| 5,995,910 A | 11/1999 | Discenzo |
| 6,098,022 A | 8/2000 | Sonnichsen et al. |
| 6,199,018 B1 | 3/2001 | Quist et al. |
| 6,301,572 B1 | 10/2001 | Harrison |
| 6,415,206 B1 * | 7/2002 | Ventres ........................ 700/280 |
| 6,466,888 B1 * | 10/2002 | McCool et al. ............. 702/144 |
| 6,567,757 B1 * | 5/2003 | Bechhoefer et al. .......... 702/56 |

FOREIGN PATENT DOCUMENTS

| | | |
|---|---|---|
| EP | 0577159 | 1/1994 |
| JP | 08159928 | 6/1996 |
| JP | 08221137 | 8/1996 |
| JP | 07190849 | 7/1997 |

* cited by examiner

METHOD AND DEVICE FOR DETECTING DEFECTS OF AT LEAST ONE ROTARY WING AIRCRAFT ROTOR

CROSS-REFERENCE TO RELATED APPLICATIONS

This application is a 371 of PCT/FRO2/01630, filed May 15, 2002.

BACKGROUND OF THE INVENTION

The present invention relates to a method of detecting defects, if any, of at least one rotor of a rotary wing aircraft, in particular a helicopter, and for adjusting the rotor. The invention also relates to apparatus for determining defects and adjustment values for adjustment parameters of such a rotor.

In the context of the present invention:

the term "detecting defects of the rotor" is used to mean detecting defective parts of said rotor (e.g. in non-exhaustive manner, a ball bearing, a lag damper, an undercut leading edge of a blade, a pitch-link or any other mechanical part presenting a defect, that might generate an increased level of rotor vibration), which elimination of said defects corresponding to replacing the defective parts; and the term "adjusting the rotor" is used to mean adjusting particular elements of the rotor (e.g. compensating tabs or weights mounted on the rotor blades) for the purpose of reducing and minimizing the vibration of at least one portion (e.g. the pilot's seat) of a rotary wing aircraft.

Such vibration constitutes a major problem that needs to be countered, since such vibration leads to:

alternating stresses throughout the aircraft giving rise to fatigue phenomena, and thus having a direct influence on safety;

vibrations in the fuselage which can reduce the precision and the effectiveness of equipment, in particular weapons, mounted on said fuselage; and vibrations in the cabin, which is naturally very troublesome for the comfort of the pilots and the passengers.

Document EP-0377 666 (U.S. Pat. No. 4,937,758) discloses a system and a method for minimizing vibration and stress within an apparatus such as a helicopter having a rotor with rotary blades disposed thereabout. Said method includes the steps consisting in (and the system includes means for):

a) calculating the effects of unit mechanical adjustments on the force and the moment exerted by the rotor on the support structure. Each specific helicopter possesses its own computer file, which remains with the helicopter throughout its lifetime. Thus, each helicopter with a serial number has its own particular database (i.e. which applies to that helicopter only) containing a vibration profile of the helicopter over time, accompanied by descriptive information relating to flight test conditions and to maintenance actions;

b) determining at least three force components and at least three moment components generated by the rotor;

c) detecting the angular position of a shaft of said rotor;

d) processing the signals representing the force and moment components and the signals representing the angular position of said shaft in order to produce the Fourier coefficients of said forces and moments;

e) determining the optimum mechanical adjustments for the rotor in order to minimize the vibrations in the support structure of the rotor, said optimum adjustments being deduced from said Fourier coefficients of the movements produced and from said calculated effects of the unit mechanical adjustments of the blades; and f) prescribing blade adjustments in agreement with said optimum mechanical adjustments.

The method of minimizing vibration, as described in that document EP-0 377 666 presents the following characteristics in particular:

on each occasion it applies to a single helicopter only, for which it is necessary to begin by calculating the effects of mechanical adjustments on the force and the moment exerted by the rotor;

it requires forces and moments to be obtained that are due firstly to a non-adjusted rotor and secondly to each of the various adjustments. These forces and moments can be deduced from measurements performed by measurement means such as accelerometers or strain gauges fixed on the structure, with the deformations thereof being measured;

it implements an approximation by assuming that the fuselage of the helicopter is a rigid body presenting six degrees of freedom (whereas, in fact, the helicopter is a deformable body which is subjected to external excitations coming in particular from the rotors and from various aerodynamic forces), and it seeks to correct the movements of said rigid body in three dimensions;

in order to be implemented, it requires knowledge of the exact locations in the helicopter cabin of said measurement means (accelerometers, strain gauges, . . . ) relative to the center of gravity of the helicopter; and in order to calculate the mechanical adjustments, it uses an ordinary linear system with influence coefficients.

That prior art method (or system) presents several major drawbacks:

A/firstly, by assuming that the helicopter is a rigid body and thus by trying to minimize the vibrations of its structure without taking account of any possible deformations thereof, said prior art method is not capable of achieving optimum adjustment of the rotor;

B/secondly, as mentioned above, it is necessary to know the actual exact location of the measurement means relative to the center of gravity of the helicopter.

Consequently, there must be no errors made while putting said measurement means in the locations that are provided for this purpose.

In addition, as the position of the center of gravity of the helicopter varies as a function of its loading, and since the locations of measurement means that are installed once only, any subsequent variation of the weight or the weight distribution within the helicopter will lead specifically to errors in implementation of the method, thereby reducing the accuracy of the adjustment achieved; and C/thirdly and above all, that prior art document recommends adjusting a helicopter rotor for the purpose of reducing vibration without taking any account of the defects, if any, of the rotor, i.e. without verifying whether parts such as the ball bearings or the dampers of said rotor are defective and are responsible at least in part for the vibration that is to be reduced.

It is known that with defects of the above type, the intensity of the vibration due to the defects varies, generally as a function of the speed of rotation of the rotor. Consequently, by using the method disclosed in document EP-0 377 666 to adjust a rotor presenting at least one such defect, while taking no account of the defect, the vibration is indeed usually reduced for the speeds of rotation that were taken into account for the adjustment, but vibration is not minimized for all speeds of rotation. On the contrary, the adjustment can even have the opposite effect, i.e. under certain conditions, it can lead to vibration being increased at other speeds of rotation.

Furthermore, it can happen that the vibration due to a defect of the rotor is so great that it becomes impossible to identify the influence matrix that enables the above-mentioned method to be implemented.

Consequently, when defects exist on the rotor, the solution recommended by document EP-0 377 666 is generally not applicable since:

it is generally not possible to reduce the levels of vibration throughout the range of flying conditions in order to guarantee satisfactory comfort; and/or it is often very difficult and sometimes impossible to identify the influence matrix needed for implementing said method.

SUMMARY OF THE INVENTION

An object of the present invention is to remedy those drawbacks. The invention relates to a method for at least detecting, in simple and effective manner, any defects of at least one rotor of a rotary wing aircraft, in such a manner as to be capable of canceling or at least minimizing the vibration (due to such defects) in at least one portion of said aircraft.

To this end, according to the invention, said method is remarkable in that:

I—in a preliminary step, in which a reference aircraft is used corresponding to a rotary wing aircraft of said particular type, having its rotor without defect and adjusted to a reference setting for which the vibration level of at least one portion of said aircraft is at a minimum, the following operations are performed:

a) taking at least a first series of measurements on said reference aircraft, by measuring, during particular operation of said reference aircraft, the values of at least two accelerations which are measured at arbitrary locations of said portion of the reference aircraft and which are representative of the vibration generated at said portion of the reference aircraft:

α) firstly using the rotor of the reference aircraft which is without defect and which is adjusted on said reference setting; and β) secondly by introducing defects into said rotor; and b) on the basis of said first series of acceleration measurements and assuming that the aircraft is a deformable body, determining a neural network that illustrates the relationships between said accelerations and at least said defects; and II—in a later step, for at least defecting any defects of the rotor of a particular rotary wing aircraft of said aircraft type, the following operations are performed:

a) taking a second series of measurements on said particular aircraft by measuring the values of at least some of said accelerations at said portion of the aircraft during particular operation of said aircraft; and b) on the basis of said second series of acceleration measurements and on the basis of the neural network determined in step I/b), detecting any defects of said rotor.

Thus, by means of the invention, it is possible to detect rotor defects (i.e. defective parts) accurately. Eliminating such defects (i.e. replacing the defective parts) then makes it possible to reduce and possibly to minimize or even cancel the vibrations in said portion (cabin, . . . ) of the aircraft.

Rotor parts that are likely to be defective, include in particular the ball bearing of the mast and the lag dampers of the blades.

In addition to detecting defects, the method in accordance with the present invention also makes it possible in simple and effective manner to adjust said rotor for the purpose of minimizing (or even canceling) all vibration of said portion of the aircraft.

To this end, said above-specified method is remarkable, according to the invention, in that:

I—in the preliminary step, the following operations are performed:

a) taking said first series of measurements on said reference aircraft in a situation γ) in addition to said situations α) and β), by measuring, during the particular operation of said reference aircraft, the values of said accelerations which are representative of vibration generated at said portion of the reference aircraft, and varying the adjustment values of a plurality of adjustment parameters of said rotor in said situation γ); and b) on the basis of said first series of acceleration measurements, determining said neural network which illustrates the relationships between firstly said accelerations and secondly said defects and said adjustment parameters; and II—in the later step, which is additionally for adjusting the rotor of the particular rotary wing aircraft of said type of aircraft, after said operations a) and b), performing the following operations:

c) on the basis of said second series of acceleration measurements and of the neural network determined in step I/b), determining the adjustment values of at least some of said adjustment parameters which enable the level of vibration of said portion of the aircraft to be minimized; and d) applying to the rotor of the aircraft the adjustment values as determined in this way for said adjustment parameters.

Thus, by means of the invention, it is possible to adjust accurately the adjustment parameters of the rotor as specified below in such a manner as to reduce vibration at the at least one portion of the aircraft, in particular in the cabin, but also in the tail boom or the fuselage, for example.

Furthermore, by means of the invention, implementation of the method requires a small number of test operations, in particular of test flights, using a reference aircraft that is without defects and that is preadjusted by the usual known means and that is of the particular type under consideration, in order to determine said neural network for subsequent use when making adjustments. The neural network can be used to analyze the rotor of any aircraft that is of the same type as the reference aircraft.

In order to show clearly the characteristics and the advantages of the method in accordance with the present invention, the following major differences between this method and the above-mentioned method described in document EP-0 377 666 are listed:

unlike the above-mentioned prior art method, the method in accordance with the invention makes it possible to detect the defects, if any, of the rotor prior to undertaking any adjustment, thus making it possible to obtain an adjustment that is optimal;

the present invention assumes that the aircraft is a deformable body and not a rigid body having six degrees of freedom, thus making it possible firstly for account to be taken of structural deformations which are very large in the vibration response of the aircraft, and secondly for it to be unnecessary to use six measurement means;

the measurements of at least two accelerations are sufficient for implementing the present invention. In addition, it is not necessary to know the locations of the accelerometers taking the measurements, whereas the prior art method uses six measurement means whose locations must be known accurately relative to the center of gravity of the helicopter, which leads to the above-mentioned drawbacks;

the method in accordance with the present invention processes the measured accelerations directly. In contrast, said prior art method begins, on the basis of the measurements taken by the accelerometers or the strain gauges, by calculating the forces and the moments that are exerted by the rotor, prior to subsequently processing these forces and moments;

the method in accordance with the invention makes use of a neural network which defines relationships that are non-linear and which is adaptable, as specified below, whereas the prior art method merely makes use of an ordinary influence matrix which naturally defines linear relationships only; and said neural network as determined once and for ever during the preliminary step I can be used subsequently for detecting defects of a rotor and for adjusting the rotor of any aircraft of the same type as the aircraft used during the preliminary step I. In contrast, the influence matrices used by said prior art method need to be determined initially for each particular helicopter whose rotor is to be adjusted, and that is lengthy and tedious.

A preferred implementation consists, between steps II/b) and II/c), in eliminating any defects that have been detected in said step II/b), and in taking a new, second series of measurements for use in step II/c) for determining the adjustment parameters, i.e. the defects are eliminated (the defective parts are replaced) once they have been determined, and prior to taking the measurements a second time in order to determine the adjustment parameters. This intermediate step is not always necessary. Nevertheless, it makes it possible to improve the effectiveness of the adjustment by performing the adjustment on an aircraft having a rotor that is without defect (i.e. without any defective part).

In addition, and advantageously, the adjustment elements defining said adjustment parameters comprise at least the following elements of the rotor of the aircraft:

at least one balance weight preferably on the sleeve of each of the blades of the rotor;

a pitch-link on each of the blades of the rotor, except for one blade which represents a reference blade; and at least one compensating tab on the trailing edge of each of the blades of the rotor.

Furthermore, in a first implementation for use with the advance and lift rotor of a rotary wing aircraft, during said step I/a), said first series of measurements are taken during at the following test flights:

a reference flight with the rotor adjusted to said reference setting;

flights with known defects deliberately introduced into the rotor;

a flight with a first particular mis-adjustment of at least one balance weight of a blade;

a flight with a second particular mis-adjustment of at least one of the blade pitch-links, after eliminating said first mis-adjustment; and a flight with a third particular mis-adjustment of at least one compensating tab provided on the trailing edge of one of the blades, after eliminating said second mis-adjustment.

In which case, and advantageously, at least one of said test flights during step I/a) and of said measurement flights during step II/a) includes the following configurations, during which measurements are taken:

a stationary flight configuration;

a configuration of flight at about 50 meters per second (m/s), i.e. about 100 knots;

a configuration of flight at continuous maximum power; and a test on the ground with the rotor revolving.

In addition, for an advance and lift rotor of a rotary wing aircraft, said portion of the aircraft where the values of said accelerations are measured is the cabin of the aircraft. However, for an anti-torque tail rotor of a rotary wing aircraft, said portion of the aircraft at which the values of said accelerations are measured is the tail boom of the aircraft.

In a second implementation, for an anti-torque tail rotor of a rotary wing aircraft, at least one of said first and second series of measurements is taken with the aircraft on the ground and the tail rotor in operation.

Furthermore, and advantageously, during step I/b), account is taken of the following additional assumptions for determining said neural network:

the rotor is not isotropic;

the relationships between firstly the defects and the adjustment parameters and secondly the acceleration values are not linear; and the vibration level existing at any particular point of the aircraft (which is assumed to be deformable) corresponds to the sum of the elementary vibrations generated at said particular point and caused by the defects and the mis-adjustment of said adjustment parameters.

In addition, and preferably, during step II/c), the adjustment value á of an adjustment parameter is determined by minimizing the following expression:

in which:

$$\|R(\alpha)+\gamma\|^2$$

R is the corresponding transfer function of said measurement neural network; and γ is a vector containing the vibration level representative of the measurements taken in step II/a).

Furthermore, in the invention, during step II/c), it is also possible:

to display the adjustment values that have just been determined, in particular on an ordinary screen; and/or to record said values on an ordinary recording medium so as to be able to use them subsequently, in particular to predict future levels; and/or to display the acceleration values after the adjustments as predicted by the neural network.

The same can be done during step II/b) for rotor defects.

Furthermore, in the invention, it is possible to provide a resetting stage in order to take account of features specific to a given aircraft, during which the following operations are performed:

a) taking a third series of measurements while causing the adjustment values of only some of said adjustment parameters to vary; and b) adjusting said neural network on the basis of said third series of measurements, for the corresponding relationships which relate to the adjustment parameters for which the adjustment values have been varied.

The present invention also provides apparatus for detecting defects and for determining adjustment values for adjustment parameters of a rotor of a rotary wing aircraft.

According to the invention, said apparatus is remarkable in that it comprises:

- a calculator suitable for automatically determining said defects and said adjustment values, in the manner specified above, on the basis of a neural network and on the basis of measurement values of a second series of measurements;
- interface means between said apparatus and an operator, enabling the operator to input said measurement values of said second series of measurements into said calculator; and
- indicator means for informing said operator of the defects and the adjustment values determined by said calculator.

In addition, and advantageously, said calculator is suitable for determining said neural network on the basis of measurement values of a first series of measurements, and said interface means further enables said operator to input into said calculator said measurement values of said first series of measurements.

Furthermore, said device may also include a memory for storing said neural network.

BRIEF DESCRIPTION OF THE DRAWINGS

The figures of the accompanying drawings will make it well understood how the invention can be implemented. In these figures, identical references designates elements that are similar.

DESCRIPTION OF THE PREFERRED EMBODIMENTS

Figure 1:
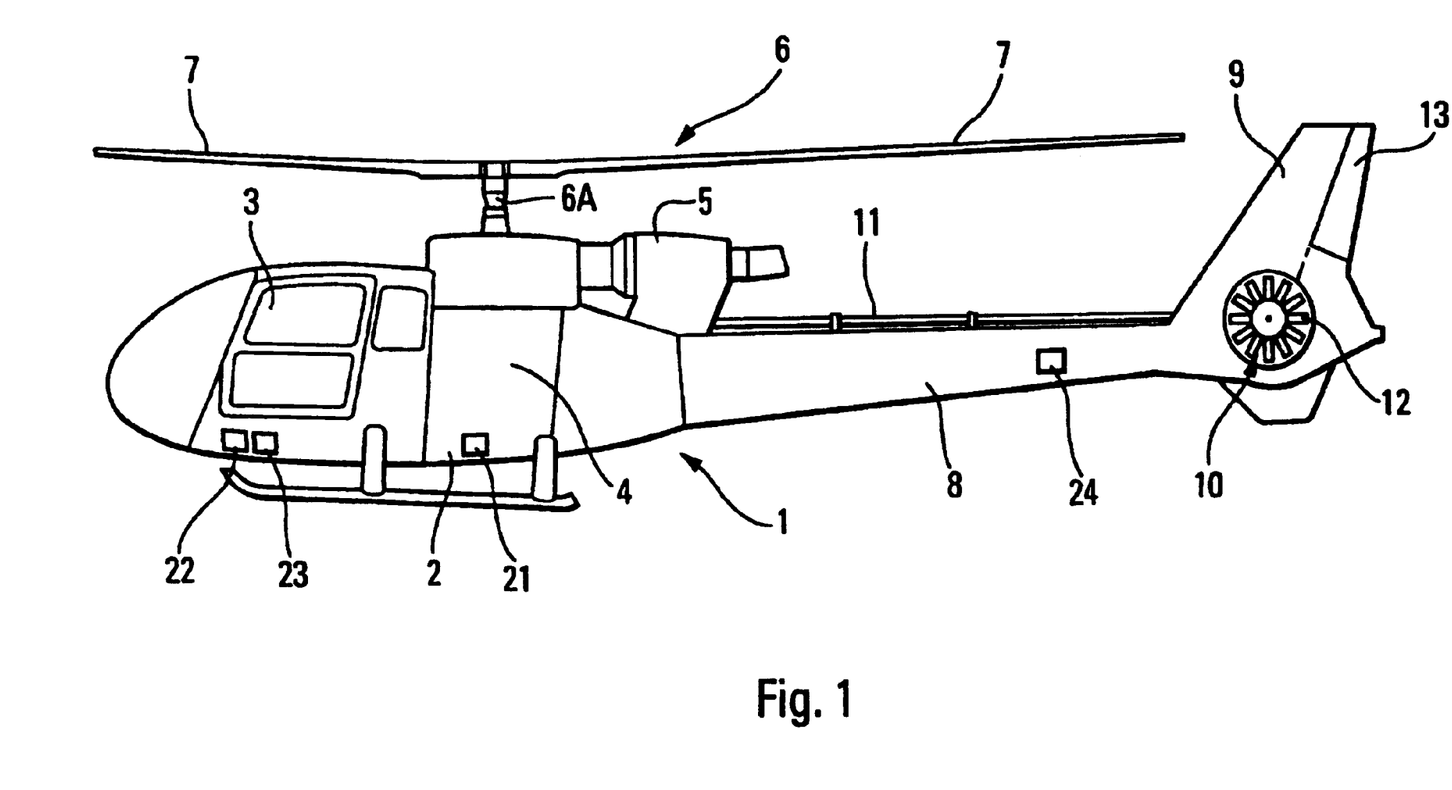
FIG. 1 is a diagram showing a rotary wing aircraft, to which the present invention is applied.

The rotary wing aircraft, specifically a helicopter 1, shown in FIG. 1 and to which the present invention is applied, comprises in the usual way a fuselage 2 having the cockpit 3 disposed in the front portion thereof. The intermediate portion 4 of said fuselage includes a power plant 5 suitable for driving rotation of the main advance and lift rotor 6 made up of blades 7. The fuselage is extended up by a tail boom 8, having disposed at the free end thereof a fin 9 provided with a rudder 13. In addition, at the aft end of the tail boom 8, e.g. at the base of the fin 9, there is provided an anti-torque tail rotor 10 of variable pitch, driven in rotation by the power plant 5 via a rotary shaft 11 and including blades 12. Said anti-torque rotor 10 is preferably ducted in a fairing constituted by the base of the fin 9.

The present invention relates to a method of detecting defects of at least one of the rotors 6 and 10 of the helicopter 1 in order to adjust said rotor 6 and 10 in order to obtain a low level of vibration in 1 Ω, in particular, where Ω is the speed of the rotor, in the three directions of the helicopter 1 (axial, lateral, and vertical) in order to achieve optimum comfort and maximum operating safety. This adjustment is performed systematically after manufacture and thus prior to the first flight of the helicopter 1, and also after any maintenance operation on a rotor 6, 10. It may also be performed at any time, if so desired, or if the operation of the rotor 6, 10 makes it necessary.

To do this, the method in accordance with the invention presents at least:

- a preliminary step or "training step" I; and
- at least one later step II of eliminating defects, and possibly of actual adjustment.

In the context of the present invention, a defect of the rotor 6, 10 corresponds to a defective state of a part of said rotor (in particular constituting a source of vibration), specifically a lag damper of a blade 7 or a bearing of the mast 6A of the rotor 6.

According to the invention, in said preliminary step, in which use is made (exclusively) of a reference helicopter corresponding to a helicopter of some particular type (Ecureuil, Puma, . . . ) under consideration for adjustment, and having its rotor 6, 10 without defect (no faulty part) and adjusted on a reference setting, for which the level of vibration of at least a portion of said helicopter 1 (cabin 3, tail boom 8, . . . ) is at a minimum:

a) at least a first series of measurements are taken on said reference helicopter, measuring during a particular operation of said reference helicopter 1, the values of at least two accelerations which are measured at arbitrary points of said portion 3, 8 of the reference helicopter and which are representative of vibration generated at said portion of the reference helicopter:

α) with the rotor 6, 10 of the reference helicopter 1 which is adjusted on said reference setting;

β) by introducing defects into said rotor 6, 10; and

γ) by varying the adjustment values of a plurality of adjustment parameters of said rotor; and b) from said first series of acceleration measurements, and taking into consideration that the helicopter 1 is a body that is deformable (i.e. non-rigid or presenting a certain amount of flexibility), a neural network is determined as described below, which neural network illustrates the relationships between firstly said accelerations, and secondly said defects and said adjustment parameters.

In addition, in accordance with the invention, in a later step II, in order to detect possible defects and in order to adjust the rotor of any particular helicopter 1 of said type (Ecureuil, Puma, . . . ):

a) a second series of measurements are taken from said particular helicopter 1 whose rotor 6, 10 is to be adjusted, by measuring the values of at least some of said accelerations at said above-mentioned portion (cabin, . . . ) of said particular helicopter 1, during a particular operation of said particular helicopter. Amongst the accelerations measured during said first series of measurements, use is preferably made of those which are the most sensitive;

b) on the basis of said second series of acceleration measurements and the neural network determined in step I/b), the defects, if any of said rotor are detected;

c) on the basis of said second series of measurements and the neural network determined in step I/b), the adjustment values of at least some of said adjustment parameters are determined, enabling the level of vibration of said portion of said helicopter to be minimized; and d) the adjustment values as determined in said way for said adjustment parameters are applied to the rotor 6, 10 of said helicopter 1.

The helicopter 1 shown in FIG. 1 may be a reference helicopter or a helicopter for adjustment. In order to simplify the description, reference is made to FIG. 1 in both cases.

It is recalled that a neural network is usually made up of a set of elements operating in parallel and such that for data inputs, the outputs of the set are characterized by the network. These elements take their inspiration from biological nerve systems. As with biological neurons, the functions of the network are highly determined by the connections between elements. It is thus possible to "train" a neural network so that it is capable of accomplishing some particular function by adjusting the values of the connections (known as "weights") between the elements. This "training" is done or adjusted so that for a given input the network delivers a specific output. Concerning neural networks, reference can be made for example to an article entitled "Learning representation by back-propagation errors" by D. Rumlhart, G. Hinton, and R. Williams, published in the review Nature, 1996, Vol. 323, pp. 533 to 536.

As mentioned above, for a given type of helicopter the training can be performed once only during said preliminary training stage. For this purpose, the defects and adjustment parameters on the rotor are modified in controlled manner and the response of the helicopter to such modifications is determined. The relationships between firstly the defects and the variations in the adjustment parameters at the rotor, and secondly the vibration at various points of the helicopter are then determined. These relationships, represented mathematically by the neural network, are the basic relationships for a given type of helicopter (Ecureuil, . . . ). Subsequently they are used, if necessary, to minimize fuselage vibrations (1 $\Omega$, 2 $\Omega$) at as many points is desired, along all three axes, with this being done in one or two flights only.

By varying each of the above-specified adjustment parameters of the rotor one by one (and also the defects one by one), and by recording the vibration (acceleration) differences relative to the reference at a plurality of judiciously chosen points of said portion of the helicopter, in particular the cockpit, the network R is obtained. For each operating configuration and for each harmonic (obtained by the Fourier transform), this network gives the relationships between each measurement point and each adjustment parameter and each defect.

The neural network (specific to one type of helicopter 1) is of the "feed-forward" type constituted by $N_{ce}$ input cells ($N_{ce}=N_p$ adjustment parameters×$N_b$ defects×b blades), without bias, and possessing the identity function at its activation function. The output layer is formed by $N_{cs}$ cells ($N_{cs}=N_a$ accelerometers×C flight configurations×H harmonics for the real part and the imaginary part at each point) likewise having the identity function as its activation function, and still without bias.

According to the invention, each defect which is to be sought out subsequently is initially identified. Taking the example of a blade lag damper, the following operations are thus performed:

a damper, presenting the defect that is to be detected (if it exists) on other helicopters, is installed on the reference helicopter;

on the ground with the rotor turning, or possibly in flight if the state of the damper makes that possible, the vibrations associated with said defect are recorded and the signature of the defect in terms of amplitude and phase is established, which signature is distinguished from the defect-free reference type signal. It constitutes a kind of training algorithm which the neural network is going to be made to learn. Thus, a neural network will be available that is specialized and that knows how to recognize such a defect; and in operation, the detected defect signature is recognized by the neural network, in application of appropriate criteria, from defects in a list of pre-established defects, with this being because of the particular amplitudes or phase offsets of the signals coming from the detectors (accelerometers, . . . ).

The preliminary training step I uses a conventional minimizing algorithm using the conjugate gradient method.

Figure 2:
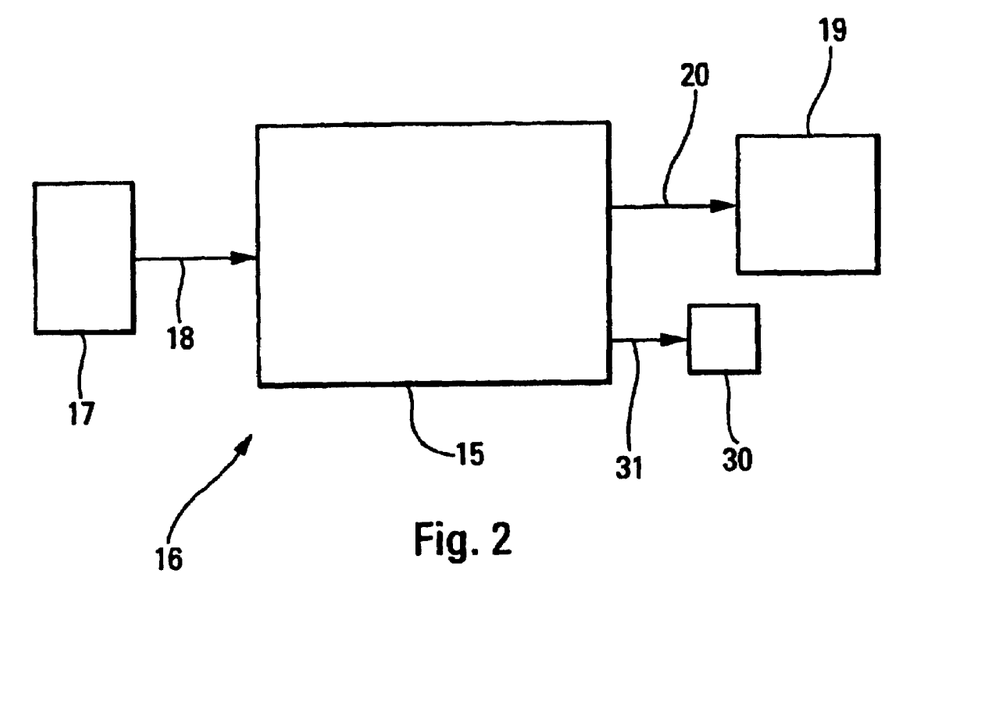
FIG. 2 is a block diagram of apparatus in accordance with the invention for detecting defects (defective parts) and for determining the adjustment values (adjustment parameters) of at least one rotor of a rotary wing aircraft.

Said neural network is calculated automatically by a calculator 15, e.g. a microcomputer, which forms part of apparatus 16 in accordance with the invention, shown diagrammatically in FIG. 2 and further comprising:

interface means 17, e.g. a keyboard, which is connected via a connection 18 to the calculator 15 and which enables an operator to input data into said calculator 15, and in particular the measurement values of said first and second series of measurements; and indicator means 19, e.g. a display screen or audible indicator means, which are connected by a connection 20 to the calculator 15 and serve to inform the operator of the results of the processes performed by the calculator 15, and in particular of the adjustment values for the adjustment parameters.

Thus, by means of the invention, it is possible to detect defects and to adjust precisely the adjustment parameters specified below for the rotor 6, 10 so as to reduce vibrations in at least a portion of the helicopter 1, in particular in the cabin 3, but also on the tail boom 8, or the fuselage 2, for example.

It should be observed that the calculator 15 may operate not only in the frequency domain in a Fourier representation, but also in the time domain.

Naturally, the present invention can be used merely for determining the defects of a rotor 6, 10 [in above-specified later step II: performing operations a) and b) only], without it being essential to adjust the rotor [above-mentioned later step II: operations c) and d) not performed].

Furthermore, in a preferred embodiment, between steps II/b) and II/c), any defects detected in said step II/b) are eliminated and a new series of measurements are taken for use in step II/c) in order to determine the adjustment parameters, i.e. once they have been determined, defects are eliminated (defective parts are replaced, e.g. a lag damper of a blade 7 presenting a loss of stiffness or of damping), with this being done prior to taking measurements again subsequently to determine the adjustment parameters. This intermediate step is not always necessary. Nevertheless, it makes it possible to increase the effectiveness of the adjustment by performing the adjustment on an aircraft having a rotor (for adjustment) without defect.

In addition, by means of the invention, implementation of the method requires a number of test operations that is small, in particular a small number of test flights, as explained in greater detail below, using a reference helicopter which is pre-adjusted by known and usual means and which is of a particular type, in order to determine said neural network which is used subsequently during later adjustments. The neural network may be used for adjusting the rotor 6, 10 of any helicopter 1 (including the helicopter that was used as the reference helicopter), providing it is of the same type as the reference helicopter.

Advantageously, in particular for adjusting the main rotor 6, said plurality of accelerations whose values are measured using ordinary accelerometers (some shown diagrammatically at 21, 22, 23, and 24 in FIG. 1) may comprise, by way of non-limiting example, at least some of the following accelerations in the cockpit 3 of the helicopter:

longitudinal, lateral, and vertical accelerations at the floor of the cabin 3, substantially vertically beneath the mast 6A of the main advance and lift rotor 6 of said helicopter, one of said accelerations being suitable for being measured by the accelerometer 21;

the vertical acceleration of the pilot's seat; and the lateral and vertical accelerations of the co-pilot's seat, measured by the accelerometers 22 and 23.

It is recalled that in the context of the present invention, it is not necessary for the accelerometers to be located at specific locations that are known accurately. However, it can be advantageous to arrange at least some of the accelerometers at vibration antinodes in the floor of the helicopter 1.

In addition, in order to adjust the tail rotor 10, accelerations are measured in particular of the tail boom 8 carrying the rotor 10, e.g. using the accelerometer 24.

Figure 3:
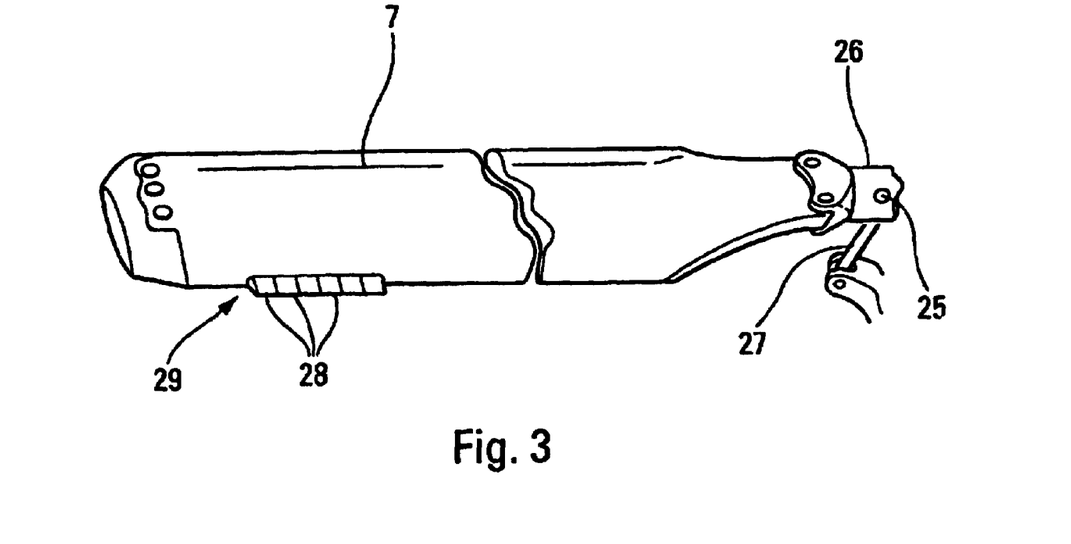
FIG. 3 is a fragmentary diagrammatic view of a rotor blade provided with adjustment elements in accordance with the invention.

In the invention, in order to adjust the rotor 6, the adjustment elements which define said adjustment parameters comprise at least the following usual elements (associated with each of the blades 7 of the rotor 6 of the helicopter 1):

balance weights 25 which are preferably provided at the sleeve 26 of each blade 7 of the rotor 6 and which enable rotor unbalance to be minimized by shifting the center of gravity along the span of the assembly constituted by the blade, the sleeve, and the corresponding portion of the hub;

a pitch-link 27 which may be lengthened or shortened for each blade 7 of the rotor 6, with the exception of one of the blades which represents a reference blade. It is known that by lengthening the pitch-link 27, the pitch and thus the lift of the blade is increased, and that by shortening the pitch-link 27, lift is reduced; and compensating tabs 28 which are provided on the trailing edge 29 of each blade 7 of the rotor 6 and which enable differences in lift between the blades 7 to be compensated.

In addition, in the invention, during step I/b), account is taken of the following additional assumptions when determining said neural network:

the rotor 6, 10 is considered as being non-isotropic;

the helicopter 1 is assumed to be a deformable body, for the first two harmonics of the frequency of rotation of the rotor 6, 10;

the relationships between firstly the defects and the adjustment parameters, and secondly the acceleration values are non-linear; and the level of vibration that exists at any particular point of the helicopter 1 is assumed to correspond to the sum of the individual vibrations generated at said particular point and caused by the defects and mis-adjustments of said adjustment parameters.

Furthermore, in a first embodiment for adjusting the advance and lift rotor 6 of the helicopter 1, during said step I/a), said first series of measurements is taken during at least the following test flights:

a reference flight with the rotor 6 adjusted to said reference adjustment (which enables vibration levels to be minimized);

flights with selected defects of the rotor 6;

a flight with a particular mis-adjustment of at least one balance weight 25 which is preferably provided on the sleeve 26 of one of the blades 7;

a flight with a particular mis-adjustment of at least one pitch-link 27 of one of the blades 7; and a flight with a particular mis-adjustment of at least one compensating tab 28 provided on the trailing edge 29 of one of the blades 7.

Under such circumstances, and advantageously, at least one of said test flights performed in said step I/a) and said measurement flights performed in step II/a) include the following configurations, during which measurements are taken:

a stationary flight configuration:

a flight configuration at about 50 m/s, i.e. about 100 knots;

a flight configuration at continuous maximum power; and a test on the ground with the rotor revolving.

It should be observed that for the flights with defects, the number of configurations can be small.

In this case (adjustment of the rotor 6), in addition, above-mentioned step II/b) of the method of the invention is implemented including the following operations:

A1/File Processing

Since the reference position of the rotor is different for each helicopter 1, it is necessary to reset measurements so as to conserve the same origin. Let α be the angle (positive in the direction of rotation) between the reference position of the rotor and the reference blade, giving:

$$\phi'_{c,a,h} = \phi_{c,a,h} - h\alpha$$

where $\phi'$ and $\phi$ are respectively the phase of the vibration level before and after resetting, c represents one of a plurality (e.g. four) of flight configurations; a represents one of a plurality (e.g. seven) of accelerometers, and h represents one of a plurality (e.g. three) of harmonics. The phases are transformed from degrees into radians. The data is then transformed from trigonometrical notation into complex number notation (with real and imaginary parts).

B1/Identification of Defects, if Any, of the Rotor 6

C1/Calculating the Adjustment Values

The helicopter 1 possess a neural network R characterized by its connection weights. Let γ be the vibration vector measured on the helicopter 1 while the rotor 6 is poorly adjusted, with the vector α corresponding to the optimum parameters minimizes the following relationship:

$$F(\alpha) = \|R(\alpha) + \gamma\|^2$$

It is necessary to calculate the gradient B of the function F relative to α:

$$B = \frac{\partial F}{\partial \alpha} = \frac{\partial \|R(\alpha) + \gamma\|^2}{\partial \alpha}$$

The value of α at an iteration i is written αi.

For an iteration i, the updating of the adjustment parameter vector is written as follows:

αi=α(i−1)+N.Bi, where N is the down step size.

Iterations are repeated so long as F is above a particular threshold (threshold that needs to be determined during design).

D1/Weighting

In order to achieve an optimum adjustment relative to the use and to the behavior of the helicopter 1, it is necessary to introduce weighting into the above-mentioned function F. It must be possible to perform weighting depending on:

flight configurations:

accelerometers; and harmonics.

The function F is then written:

$$F(\alpha) = \sum_c \lambda_c \sum_a \lambda_a \sum_h \gamma_{\cdot h} \|R_{c,a,h}(\alpha) + \gamma_{c,a,h}\|^2$$

where $R_{c,a,h}(\alpha)$ is the output cell corresponding to harmonic h of accelerometer a of configuration c.

Furthermore, in order to adjust the tail rotor 10 of a helicopter, said step I/a) of taking said first series of measurements, and said step II/a) of taking said second series of measurements are performed with the helicopter 1 on the ground and with the tail rotor 10 in operation.

Under such circumstances, implementation of above-mentioned step II/b) of the method in accordance with the invention comprises the following operations:

A2/File Processing

Since the reference position of the rotor is different for each helicopter 1, it is necessary to reset the measurements so as to conserve the same origin. Let α be the angle (positive in the direction of rotation) between the reference position and the reference blade, giving:

$$\phi'_a = \phi_a - \alpha$$

where $\phi'$ and $\phi$ are the phase of the vibration level before and after resetting, respectively, a=1 or 2 representing the accelerometer. Phases are transformed from degrees into radians. The data is then transformed from trigonometrical notation into complex number notation (with real and imaginary parts).

B2/Identifying the Defects, if Any, of the Rotor 10

C2/Calculating the Adjustment Values

The adjustment algorithm is identical to the algorithm for adjusting the main rotor 6 (above-mentioned operation C1).

D2/Weighting

In order to achieve optimum adjustment relative to the use and the behavior of the helicopter 1, it is necessary to introduce weighting of the function F. It must be possible to apply weights depending on accelerometer.

The function F is then written as follows:

$$F(\alpha) = \sum_a \lambda_a \|R_a(\alpha) + \gamma_{a\_}\|^2$$

where $R_a(\alpha)$ is the output cell corresponding to accelerometer a.

In addition to being capable of being displayed by the means 19, the adjustment values of the adjustment parameters as determined by the calculator 15 can also be stored in a memory 30 which is connected via a connection 31 to said calculator 15, and they can be used subsequently, e.g. for making comparisons.

In the context of the present invention, it is also possible to perform a resetting stage subsequently, in which:

a) a third series of measurements is taken during which the adjustment values of only some of said adjustment parameters are varied; and b) said neural network is adjusted on the basis of said third series of measurements for the corresponding relationships which relate to the adjustment parameters whose adjustment values were varied.

Consequently, the method in accordance with the invention also presents the following advantages:

the adjustments to be applied are calculated in a single step;

the adjustments are obtained from one or two flights, which limits the time during which the helicopter 1 is unavailable; and it is self-adaptive, i.e. the neural network can be adapted without specific additional flights (using the ordinary flights for performing final adjustments of the helicopter), such that said network gives the best representation of the behavior of the new helicopter.

The invention claimed is:

1. A method of at least detecting defects, if any, of at least one rotor (6, 10) of a first rotary wing aircraft, a defect corresponding to a defective state of a part of the rotor (6, 10), wherein:

I—in a preliminary step, using a second reference aircraft of a type corresponding to the first rotary wing aircraft, and having its rotor (6, 10) without defect and adjusted to a reference setting for which the vibration level of at least one portion (3, 8) of said reference aircraft is at a minimum, the following operations are performed:

a) taking at least a first series of measurements on said reference aircraft by measuring, during particular operation of said reference aircraft, the values of at least two accelerations which are measured at arbitrary locations of said portion (3, 8) of the reference aircraft and which are representative of the vibration generated at said portion (3, 8) of the reference aircraft:

i) firstly using the rotor (6, 10) of the reference aircraft which is without defect and which is adjusted on said reference setting; and ii) secondly by introducing a defective replacement part into said rotor (6, 10); and b) on the basis of said first series of acceleration measurements and assuming that the reference aircraft is a deformable body, determining a neural network that illustrates the relationships between said accelerations and at least said introduced defective replacement part in the reference aircraft; and II—in a later step, for at least detecting any defects of the rotor (6, 10) of the first rotary wing aircraft, the following operations are performed on the first rotary wing aircraft:

a) taking a second series of measurements on said first rotary wing aircraft by measuring the values of at least some of said accelerations at said portion (3, 8) of the first rotary wing aircraft during particular operation of said first rotary wing aircraft; and b) on the basis of said second series of acceleration measurements and on the basis of the neural network determined in step I/b), detecting any defects of said rotor (6, 8) in the first rotary wing aircraft.

2. A method according to claim 1, further comprising, in the preliminary step, a) taking said first series of measurements on said reference aircraft in a situation iii) in addition to said situations i) and ii), by measuring, during the particular operation of said reference aircraft, the values of said accelerations which are representative of vibration generated at said portion (3, 8) of the reference aircraft, and varying the adjustment values of a plurality of adjustment parameters of said rotor (6, 10) in said situation iii); and b) on the basis of said first series of acceleration measurements, determining said neural network which illustrates the relationships between firstly said accelerations and secondly said defective replacement part and said adjustment parameters; and in the later step, c) on the basis of said second series of acceleration measurements and of the neural network determined in step I/b), determining the adjustment values of at least some of said adjustment parameters which enable the level of vibration of said portion (3, 8) of the first rotary wing aircraft to be minimized; and d) applying to the rotor (6, 10) of said first rotary wing aircraft the adjustment values as determined in this way for said adjustment parameters.

3. A method according to claim 2, characterized, between steps II/b) and II/c), by eliminating any defects that have been detected in said step II/b), and by taking a new, second series of measurements for use in step II/c) for determining the. adjustment parameters.

4. A method according to claim 2, characterized in that the adjustment elements defining said adjustment parameters comprise at least the following elements (25, 27, 28) of the rotor (6) of the reference aircraft:

at least one balance weight (25) for each of the blades (7) of the rotor (6);

a pitch-link (27) on each of the blades (7) of the rotor (6), except for one blade which represents a reference blade; and at least one compensating tab (28) on the trailing edge (29) of each of the blades (7) of the rotor (6).

5. A method according to claim 2, characterized in that for an advance and lift rotor (6) of the reference aircraft, in said step I/a), said first series of measurements are taken during at least one of the following test flights:

a reference flight with the rotor (6) adjusted in accordance with said reference setting;

flights with defects of the rotor (6);

a flight with a particular misadjustment of at least one balance weight (25) of a blade (7);

a flight with a particular misadjustment of at least one pitch-link (27) of a blade (7); and a flight with a particular misadjustment of at least one compensating tab (28) provided on the trailing edge (29) of a blade (7).

6. A method according to claim 5, characterized in that at least one of said test flights during step I/a) and of said measurement flights during step II/a) includes the following configurations, during which measurements are taken:

a stationary flight configuration;

a configuration of flight at about 50 m/s;

a configuration of flight at continuous maximum power; and a test on the ground with the rotor (6) revolving.

7. A method according to claim 2, characterized in that during step I/b), account is taken of the following additional assumptions for determining said neural network:

the rotor (6, 10) is not isotropic;

the relationships between firstly the defective replacement part and the adjustment parameters and secondly the acceleration values are nonlinear; and the vibration level existing at any particular point of the reference aircraft corresponds to the sum of the elementary vibrations generated at said particular point and caused by the defective replacement part and the misadjustment of said adjustment parameters.

8. A method according to claim 2, characterized in that during step II/c), the adjustment value α of an adjustment parameter is determined by minimizing the following expression:

$$\|R(\alpha)+\gamma\|^2$$

in which:

R is the corresponding transfer function of said neural network; and

γ is a vector containing the vibration level representative of the measurements taken in step II/a).

9. A method according to claim 2, characterized in that during step II/c), the adjustment values that have been determined are displayed.

10. A method according to claim 2, characterized in that during step II/c), the adjustment values that have been determined are recorded.

11. A method according to claim 2, characterized in that a resetting stage is performed following the later step and during which the following operations are performed:

a) taking a third series of measurements while causing the adjustment values of only some of said adjustment parameters to vary; and b) adjusting said neural network on the basis of said third series of measurements, for the corresponding relationships which relate to the adjustment parameters for which the adjustment values have been varied.

12. A method according to claim 1, characterized in that for an advance and lift rotor (6) of the reference aircraft, said portion of the reference aircraft where the values of said accelerations are measured is the cabin (3) of the reference aircraft.

13. A method according to claim 1, characterized in that for an anti-torque tail rotor (10) of the reference aircraft, said portion of the reference aircraft at which the values of said accelerations are measured is the tail boom (8) of the reference aircraft.

14. A method according to claim 1, characterized in that for an anti-torque tail rotor (10) of, the reference aircraft and the first rotary wing aircraft, at least one of said first and second series of measurements is taken with the aircraft on the ground and the tail rotor (10) in operation.

15. A method according to claim 1, characterized in that during step II/b), the defects that are detected are displayed.

16. A method according to claim 1, characterized in that during step II/b), the defects that are detected are recorded.

17. A method of detecting defects in a rotor of a first rotary wing aircraft, the method comprising the steps of:

providing a second reference aircraft of a type corresponding to the first rotary wing aircraft, the reference aircraft having a rotor without defects and being adjusted to a reference setting for which a vibration of a portion of the reference aircraft is at a minimum;

taking a first series of measurements on the reference aircraft by measuring plural accelerations at the portion of the reference aircraft which are representative of the vibration at the portion of the reference aircraft, the first series of measurements being taken before and after introducing a defective replacement part into the rotor of the reference aircraft;

on the basis of the first series of measurements and assuming that the reference aircraft is a deformable body, determining a neural network that illustrates relationships between the plural accelerations and the defective replacement part introduced in the rotor of the reference aircraft;

taking a second series of measurements on the first rotary wing aircraft by measuring accelerations at a portion of the first rotary wing aircraft corresponding to the portion of the reference aircraft; and on the basis of the second series of measurements and the neural network, detecting defects in the rotor of the first rotary wing aircraft.

* * * * *